United States Patent [19]

Mowatt-Larssen et al.

[11] 4,440,528

[45] Apr. 3, 1984

[54] CONTAINER FOR PULVERULENT MATERIAL

[75] Inventors: Erling Mowatt-Larssen, Warren; Edward L. Davis, Youngstown, both of Ohio

[73] Assignee: General American Transportation Corporation, Chicago, Ill.

[21] Appl. No.: 412,071

[22] Filed: Aug. 27, 1982

Related U.S. Application Data

[62] Division of Ser. No. 202,762, Oct. 31, 1980, abandoned.

[51] Int. Cl.[3] .............................................. B65G 53/38

[52] U.S. Cl. ....................................... 406/90; 55/491; 55/494; 55/496; 55/511

[58] Field of Search ..................... 406/89, 90, 91, 138; 222/195; 55/491, 494, 496, 507, 509, 511

[56] References Cited

U.S. PATENT DOCUMENTS

| | | | |
|---|---|---|---|
| 2,907,404 | 10/1959 | Mare | 55/496 X |
| 2,915,339 | 12/1959 | Lusted | 406/90 |
| 3,212,824 | 10/1965 | Emery et al. | 406/90 |
| 3,268,264 | 8/1966 | Squires | 406/89 |
| 3,341,013 | 9/1967 | Moulton | 55/511 X |
| 3,379,478 | 4/1968 | Aller et al. | |
| 3,469,888 | 9/1969 | Aller et al. | 406/85 |
| 3,989,310 | 11/1976 | Aller . | |
| 4,118,074 | 10/1978 | Solt | 406/85 |

FOREIGN PATENT DOCUMENTS

| | | | |
|---|---|---|---|
| 887309 | 1/1962 | United Kingdom | 406/90 |

*Primary Examiner*—Jeffrey V. Nase
*Attorney, Agent, or Firm*—Emrich & Lee and Brown, Hill, Dithmar, Stotland, Stratman & Levy

[57] ABSTRACT

A railway car for transporting pulverulent lading includes a fluid-tight container, slope sheets mounted within the container defining two troughs leading to a sump in the lower portion of the container, two aligned permeable conveyors in the bottom of each trough, an apparatus for alternately aerating each permeable conveyor in each trough for fluidizing the lading to facilitate movement thereof into the sump. Discharge valve structure is provided below the sump for pneumatically unloading the container pipe for pressurizing the space between the slope sheets and the container, and a pipe interconnecting the top of the container and the discharge valve structure for conveying air from within the container to the discharge valve structure during unloading of the container, are also provided.

10 Claims, 20 Drawing Figures

FIG. 14
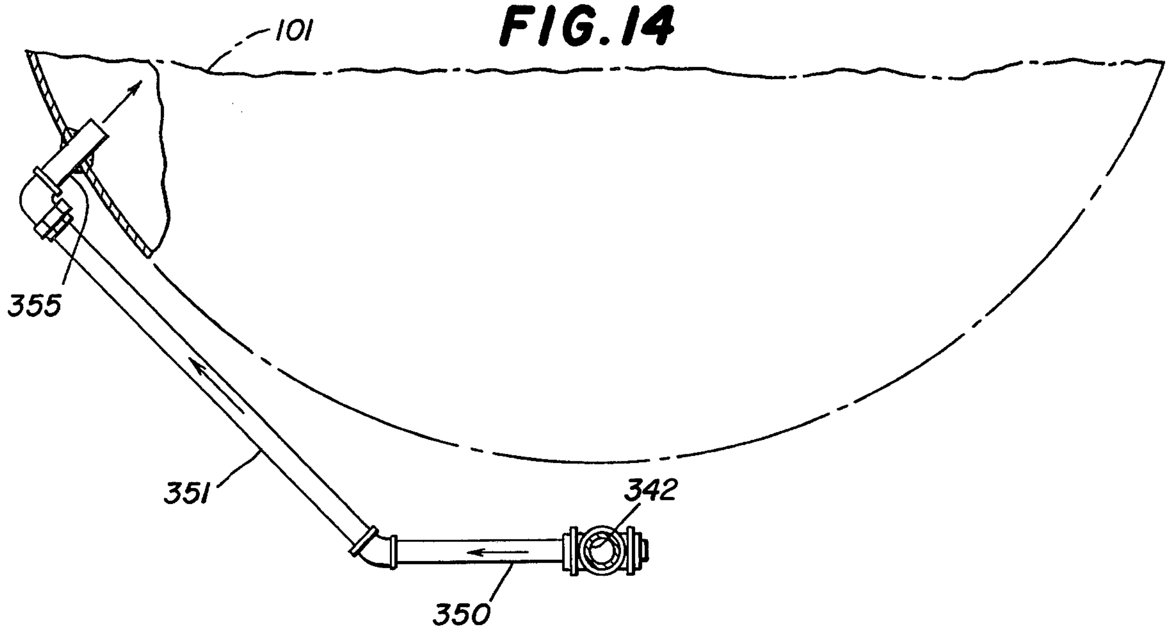
FIG. 15
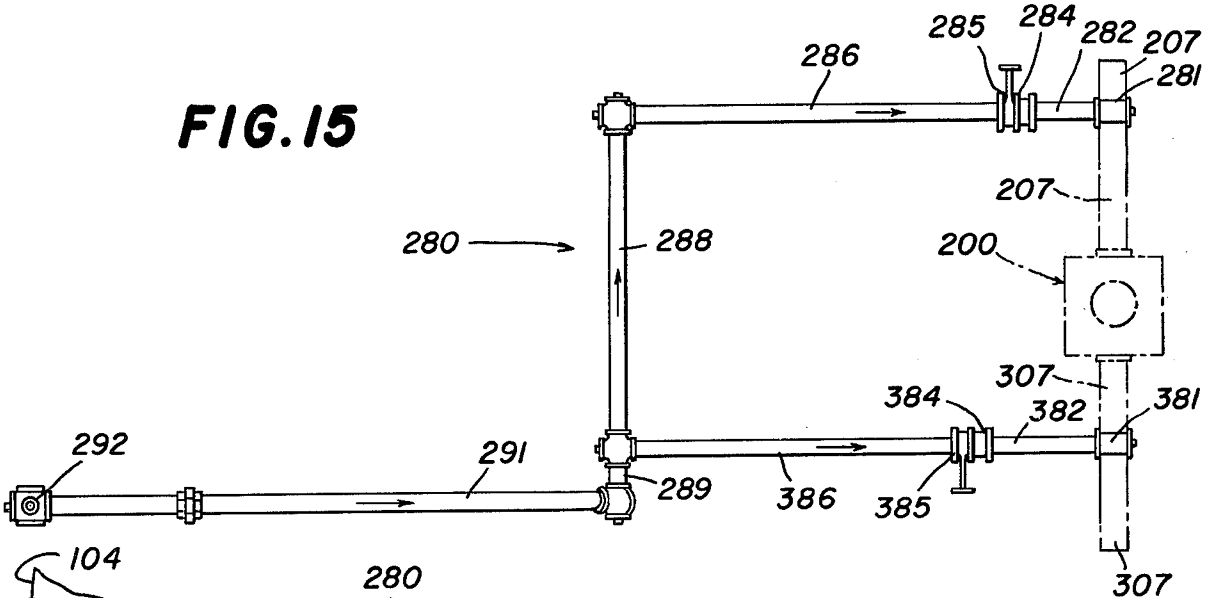
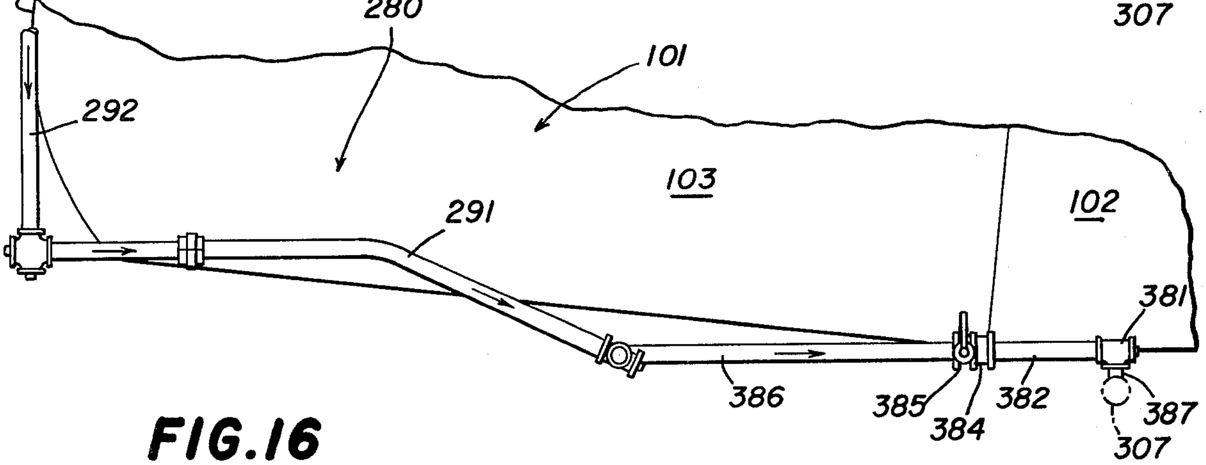
FIG. 16

CONTAINER FOR PULVERULENT MATERIAL

This is a division of application Ser. No. 202,762, filed Oct. 31, 1980, now abandoned.

PRIOR ART STATEMENT AND BACKGROUND OF THE INVENTION

The present invention relates generally to a railway car comprising a container defining a fluid-tight storage chamber adapted to receive pulverulent material lading such as cereal flour, sugar, cement, etc. and a pneumatic system of improved construction and arrangement for unloading the pulverulent material from the storage chamber.

One form of prior railway car for transporting pulverulent material ladings is shown in U.S. Pat. No. 3,379,478 granted Apr. 23, 1968 to E. R. Aller and R. F. Loomis. This patent shows two parallel permeable fluidizing conveyors in each end of the container, all four conveyors sloping downwardly to a sump at an angle for about 8° with respect to the horizontal, the common angle for such conveyors. The fluidizing conveyors in turn are each formed from a plate having openings therein carrying thereover a porous covering secured to the perforated plate. The fluidized conveyor assembly is assembled in the container from the various individual parts thereof. Such structures make uneconomical use of the volume of the container and require expensive fabrication techniques.

An improved railway car for transporting pulverulent material is illustrated in U.S. Pat. No. 3,469,888 granted Sept. 30, 1968 to E. R. Aller and P. E. Solt. This patent discloses an oscillating valve structure which alternately and abruptly aerates the troughs on the opposite sides of the sump for fluidizing the pulverulent material and moving it into the sump. A further improvement is illustrated in U.S. Pat. No. 3,989,310 granted Nov. 2, 1978 to E. R. Aller, this patent illustrating a proportioning device for proportioning the conveying air into the fluid inlet conduit and the fluid outlet conduit to maintain a predetermined ratio between the fluid pressures in the fluid inlet conduit and the fluid outlet conduit. The railway cars of both of these patents make uneconomical use of the interior cross section of the container and utilize expensive fabrication techniques.

SUMMARY OF THE INVENTION

The present invention provides an improved railway car for transporting pulverulent material incorporating an improved permeable conveyor structure and an improved pressurized unloading system.

This is accomplished in the present invention, and it is an object of the present invention to accomplish these desired results, by providing in combination a container defining a fluid-tight storage chamber adapted to receive a pulverulent material, means accommodating the loading of the pulverulent material into the storage chamber, means defining a sump in the bottom of the container and communicating with the storage chamber, structure defining an elongated trough having an open top communicating with the bottom of the storage chamber, the trough occupying an inclined position in the bottom of the container and extending from a lower position disposed adjacent to the sump to an upper position disposed remote from the sump, the lower end of the trough communicating with the sump, an elongated porous element closing the bottom of the trough and contacting the adjacent portion of the pulverulent material therein, the structure also defining an elongated plenum chamber disposed below the trough and communicating with the elongated porous element, the elongated porous element extending in an unbroken expanse the entire width of the plenum chamber and the trough, and a source of air under superatmospheric pressure connected to the plenum chamber to supply air under superatmospheric pressure thereto to penetrate the porous element and to pass into the storage chamber and also to fluidize the adjacent portion of the pulverulent material in the bottom of the trough causing the fluidized pulverulent material to feed downwardly along the porous element into the sump.

In connection with the foregoing object, another object of the invention is to provide a container of the type set forth wherein the trough is inclined at an angle of about 4° with respect to the horizontal, thus materially to increase the usable cross section of the container for containing the pulverulent material.

Still another object of the invention is to provide in a container of the type set forth an improved permeable conveyor including a frame shaped to fit into the bottom of the trough and securing an elongated porous element underlying the frame and secured by clamping bars extending along the edges of the porous element and held in place by the frame, and means mounting the frame in the trough with the porous element closing the bottom of the trough.

In connection with the foregoing object, it is yet another object of the invention to provide a container having a manway in the top providing access to the interior of the container of limited cross section, the porous element and the attached clamping bars being articulated so as to pass through the manway in a folded condition and thereafter to be mounted in essentially a planar position in the bottom of the trough.

Further features of the invention pertain to the particular arrangement of the parts of the container, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 14 is a view as seen in the direction of the arrows along the line 14—14 of FIG. 13;

FIG. 15 is a view of a portion of the piping interconnecting the discharge nozzle with the top of the container;

FIG. 16 is a side elevational view of the piping illustrated in FIG. 15;

DESCRIPTION OF THE PREFERRED EMBODIMENT

Figures 1, 2:
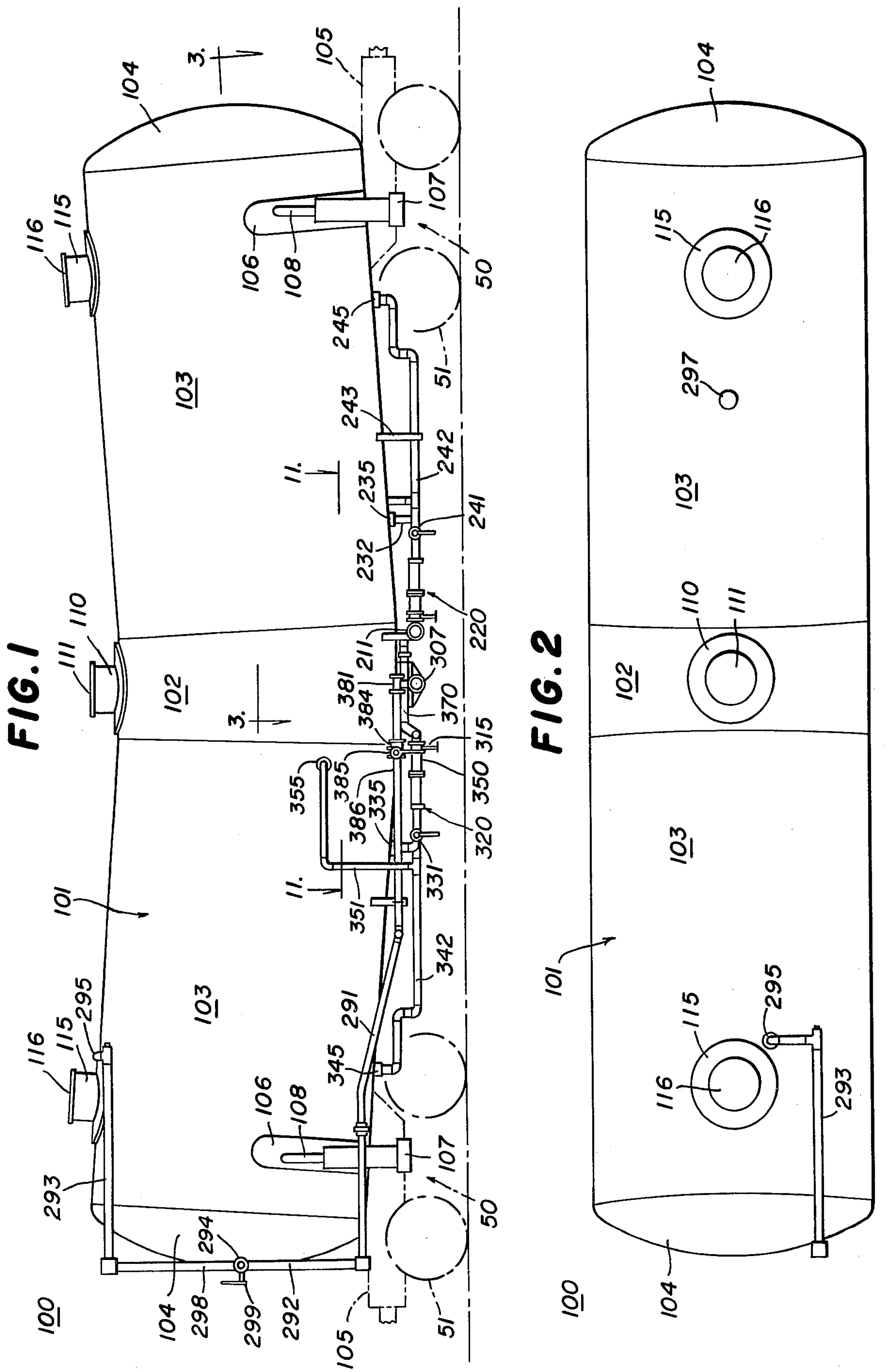
FIG. 1 is a side elevational view of a railway car including a container for pulverulent material made in accordance with and embodying the principles of the present invention.
FIG. 2 is a plan view of the railway car of FIG. 1.

Referring to FIGS. 1 and 2 of the drawings, there is illustrated a railway car 100 that comprises an elongated longitudinally extending body shell 101 defining a fluid-tight container and adapted to receive a pulverulent material lading, such as cereal flour, sugar, cement, etc., and embodying the features of the present invention. The body shell 101 is mounted upon a pair of trucks 50 that are in turn supported by sets of wheels 51, all in the usual manner. The body shell 101 further is of strong rigid self-supporting construction including a short substantially cylindrical central section 102, and a pair of substantially cylindrical end sections 103, and a pair of end headers 104. The outer ends of the central section 102 are respectively rigidly secured as by welding to the adjacent inner ends of the end sections 103 and the outer ends of the end sections 103 are respectively rigidly secured, as by welding, to the adjacent inner open ends of the end headers 104.

A pair of short stiff stub draft sills 105 are respectively arranged below the central outer portions of the end sections 103 and disposed in longitudinal alignment with each other and respectively rigidly secured in place, so that the total draft and buff forces that are applied between the stub draft sills 105 are transmitted directly through the body shell 101 and without the provision of an underframe in the railway car 100. Each of the stub draft sills 105 is rigidly secured in place by respective structures, each including a saddle plate 106, a body bolster 107, and an intervening pedestal 108.

Three manway structures are carried by the body shell 101, a first manway structure 110 being disposed at the top of the central section 102, and two manway structures 115 being provided at the central top of each of the end sections 103 and disposed toward the associated end header 104. The manway structure 110 is provided with a cover 111 while the manway structures 115 are provided with covers 116. Each of the manway covers 111 and 116 is normally arranged in fluid-tight closing relation with the associated manway structure. The manway structures 110 and 115 accommodate loading the lading into the railway car 100.

Figure 3:
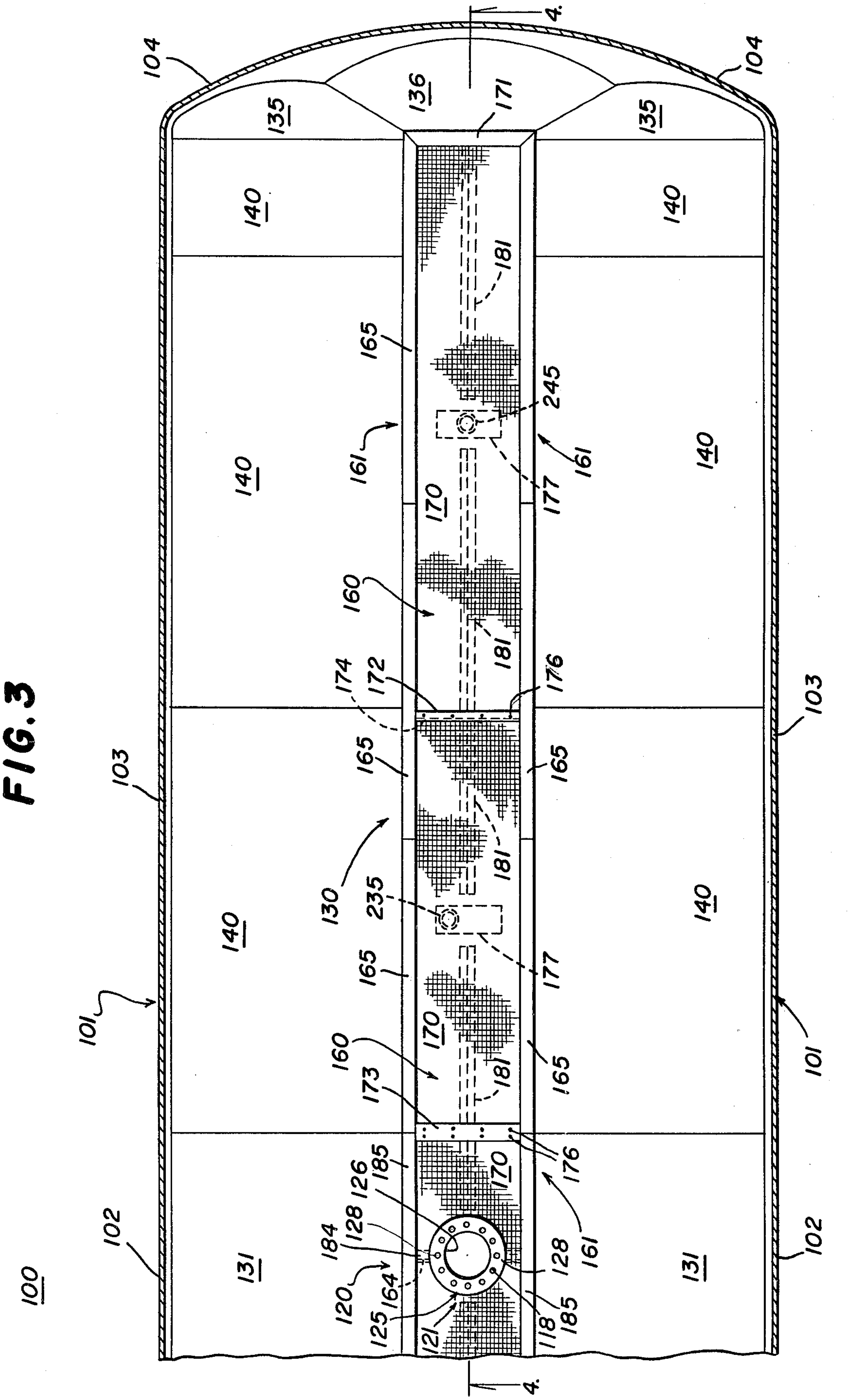
FIG. 3 is an enlarged fragmentary view in longitudinal section of the railway car of FIG. 1 seen in the direction of the arrows along the line 3—3 therein.
Figure 4:
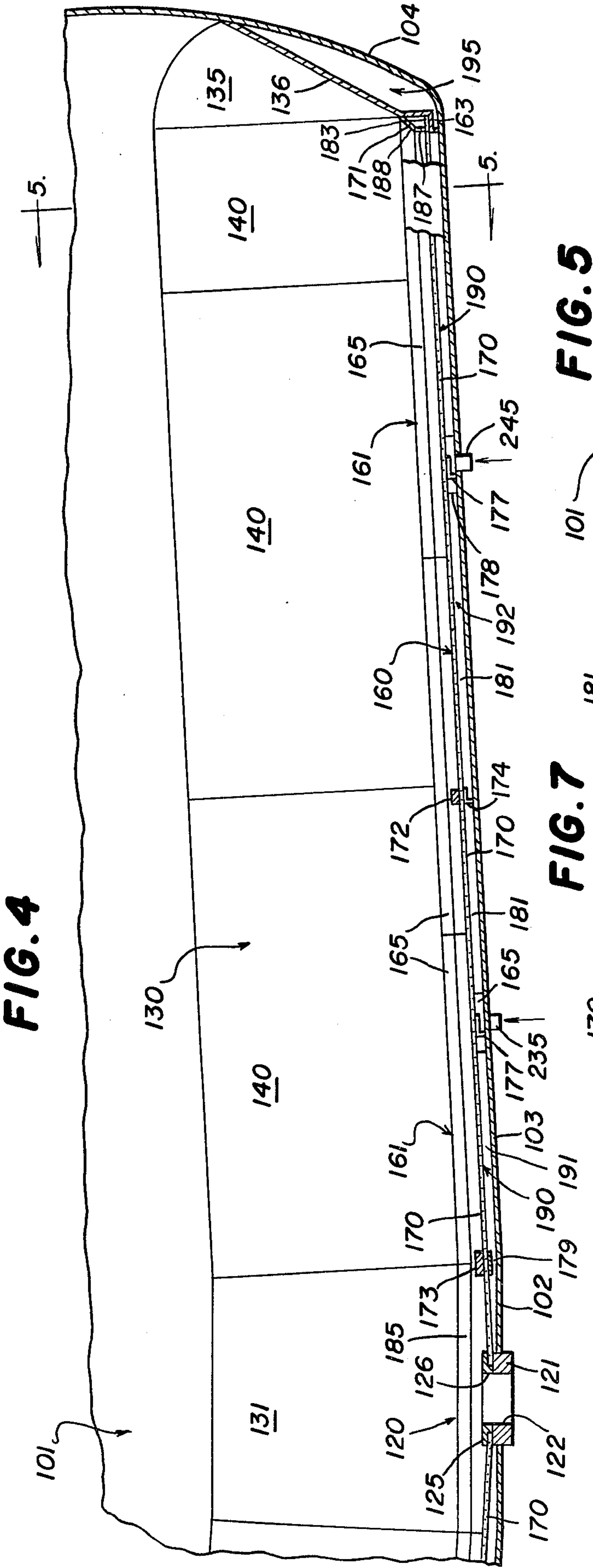
FIG. 4 is a view in vertical section along the line 4—4 of FIG. 3.
Figure 5:
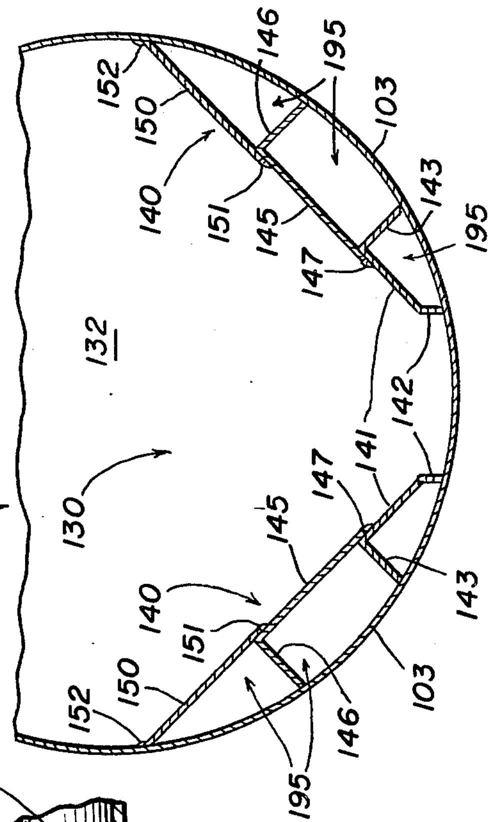
FIG. 5 is a fragmentary view in transverse section along the line 5—5 of FIG. 4 before installation of the permeable conveyors therein.
Figure 6:
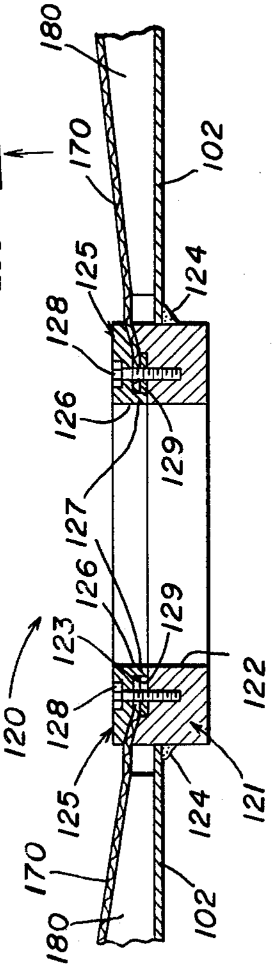
FIG. 6 is the further enlarged fragmentary view showing the sump and outlet structure for the container of FIG. 4.

Referring now to FIGS. 3, 4 and 6 of the drawings, the lower central portion of the central section 102 is provided therein with a sump generally designated by the numeral 120. More specifically, there is an opening provided in the bottom of the central section 102 in which opening is suitably secured as by welding an annular supporting ring or outlet fitting 121. The fitting 121 has a circular opening 122 therein and there is provided in the upper surface of the fitting 121 a depression or recess 123 surrounding the opening 122. Mounted on the upper surface of the outlet fitting 121 is a mounting ring 125 also annular in shape and secured to the outlet fitting 121 by a plurality of bolts 128. The mounting ring 125 has an annular opening 126 centrally thereof and an annular depending inner flange 127 that rests upon the inner top surface of the recess 123 in the outlet fitting 121. Completely surrounding the mounting ring 125 and extending outwardly and upwardly therefrom is a sheet of porous fabric 170 which will be described more fully hereinafter and which serves to direct pulverulent material toward the opening 126 in the mounting ring 125 and then through the opening 122 in the outlet fitting 121. The periphery of the porous fabric 170 surrounding the mounting ring 125 is clamped between the mounting ring 125 and a lower clamping ring 129 by bolts 118 to form a subassembly which is then secured to the outlet fitting 121 by the bolts 128, six each of the bolts 118 and 128 being provided alternating around the outlet mounting ring 125.

A trough 130 is provided in each end of the body shell 101, each trough 130 directing pulverulent material downwardly toward the longitudinal center line of the body shell 101 and then downwardly toward the center of the body shell 101 and into the sump 120. The troughs 130 are defined by slope sheets including a central slope sheet structure 131 associated with the central body shell section 102, and end slope sheet structures 135 and 136 associated with the end headers 104 and main slope sheet structures 140 interconnecting the central slope sheet structure 131 and the end slope sheet structures 135–136 and being associated with the end body shell sections 103. Details of the construction of the main slope sheet structures 140 are illustrated in FIGS. 5, 8, 9 and 10, wherein it will be seen that each of the main slope sheet structures 140 is formed of three separate slope sheets. More specifically, a bottom slope sheet 141 is provided having a longitudinally extending flange 142 along one edge thereof and a reinforcing flange 143 extending longitudinally along the other edge thereof. When installed, the flange 142 is disposed essentially vertically and is joined by welding to the end body shell section 103. The other flange 143 is disposed essentially normal to the bottom slope sheet 141 and abuts against the body shell end section 103 and is welded thereto. A center slope sheet 145 is provided that is disposed above the bottom slope sheet 141 and overlaps the same and is secured thereto as by a weld 147. A reinforcing flange 146 is provided along the upper edge of the center slope sheet 145 and is disposed essentially at right angles thereto and is secured as by welding to the body shell end section 103. Finally, a top slope sheet 150 is provided that overlaps the center slope sheet 145 and is secured thereto as by welding at 151, the upper edge of the top slope sheet 150 being secured to the body shell end section 103 as by a weld 152. Due to the overlapping structure of the top slope sheet 150 with respect to the center slope sheet 145, and the like overlapping arrangement of the center slope sheet 145 with respect to the bottom slope sheet 141, there are no crevices or obstructions that collect pulverulent material, whereby the slope sheets are self-cleaning during the unloading of the pulverulent material from the container 101.

The construction of each of the central slope sheet structures 131 is like that described above with respect to the main slope sheet structures 140. Each end slope sheet structure 135 overlaps the adjacent main slope sheet structure 140 and is secured thereto as by welding, the curved edge of the end slope sheet structure 135 being secured to the body shell end header 104 as by welding. Finally, the end slope sheet structure 136 is secured to the end slope sheet structues 135 and the body shell end header 104 as by welding.

Figure 8:
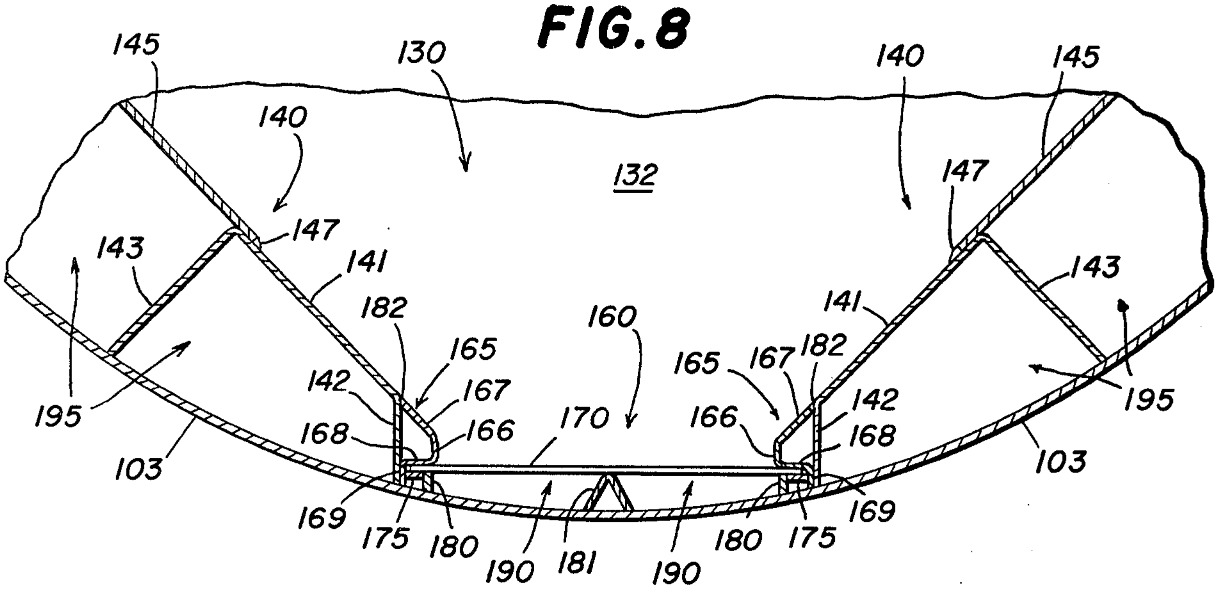
FIG. 8 is a further enlarged fragmentary view in transverse section similar to FIG. 5 and showing the permeable conveyor in position.
Figure 9:
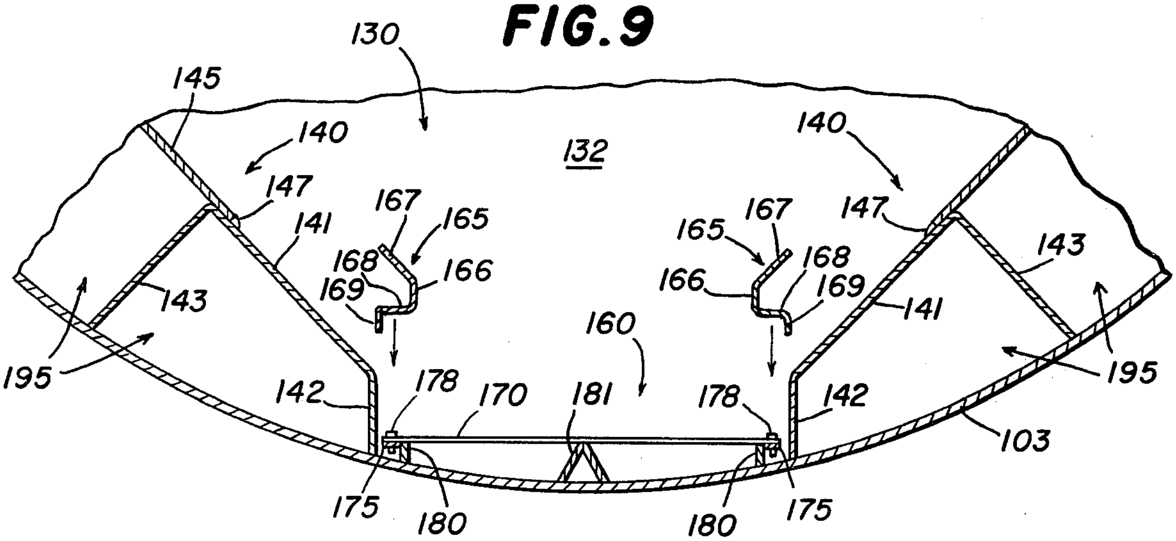
FIG. 9 is a diagrammatic view similar to FIG. 8 showing a subassembly of the porous element and attached clamping bars being installed in position in the container.
Figure 10:
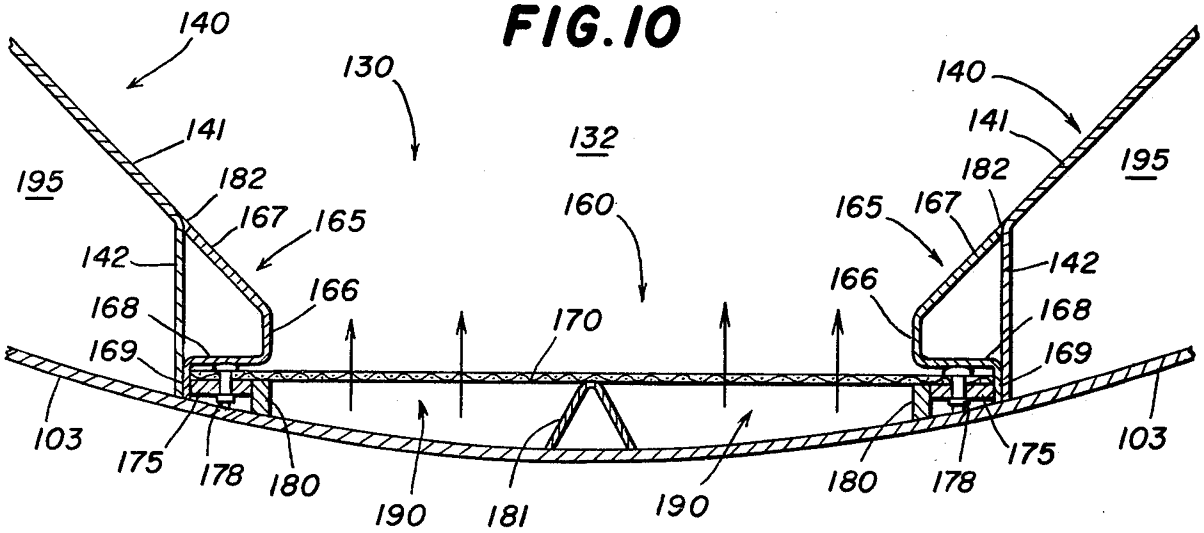
FIG. 10 is a further enlarged fragmentary view in transverse section showing the construction of the permeable conveyor and associated parts.

The cross section of the railway car 100 is first fabricated like that described above and as illustrated in FIG. 5, after which vertically extending mounting bars 180 are installed extending longitudinally of the body shell 101 and fixedly secured to the body shell 101 as by welding (see FIGS. 8, 9 and 10).

Figure 7:
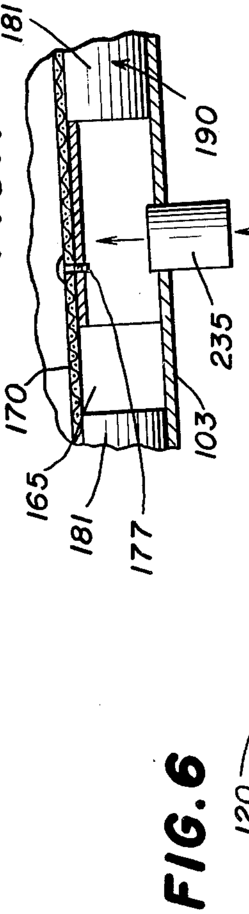
FIG. 7 is a further enlarged fragmentary view showing the connection between a source of air under pressure and the plenum chamber beneath the permeable conveyor of FIG. 4.

A center transverse barrier angle 164 is provided centrally of the body shell 101 at the tank outlet fitting 121 (see FIG. 3) and the vertical leg of the barrier 164 is secured to the body shell 101, the mounting bar 180 and the outlet fitting 121 as by welding. An end transverse barrier angle 163 is provided at the end slope sheet structure 136 and secured thereto and to the mounting bars 180 and the body shell 101 as by welding (see FIG. 4). An intermediate transverse barrier angle 174 is provided about midway between the center transverse barrier angle 164 and the end transverse barrier angle 163 and is secured to the mounting bars 180 and the body shell 101 as by welding. The horizontal legs of the barrier angles 174, 163 and 164 are flush with the top of the mounting bars 180 and together with the mounting bars 180 form a support and clamping surface for a permeable conveyor 160 described more fully hereinafter. There further is provided centrally of the mounting bars 180 a V-shaped support 181 resting upon and secured to the bottom of the body shell 101, the support 181 being formed in sections as is best seen in FIG. 3 and having the apex of the "V" thereof disposed upward and lightly touching the fabric sheet 170 when there is no load of pulverulent material upon the fabric sheet 170. There further is provided a transverse support plate 179 extending between and flush with the top of mounting bars 180 and secured thereto as by welding. Channel-shaped air baffles 177 are provided respectively above air inlet couplings 235 and 245 (see FIG. 7), the upper face of the web of each channel air baffle 177 being flush with the top of the mounting bars 180 and the flanges of the channel air baffles 177 resting on the body shell 101 and secured thereto as by welding.

Disposed above the mounting bars 180, the transverse barrier angles 163, 164 and 174, the supports 170 and 181 and the baffles 177 is a permeable conveyor 160 which extends from the end slope sheet structure 136 downwardly to the sump 120, the angle of inclination of each of the permeable conveyors 160 to the horizontal being about 4°. The permeable conveyors 160 form the bottom surfaces of troughs 130 and the top surfaces of plenum chambers 190 (see FIGS. 4 and 10). The plenum chambers 190 are bounded by the conveyors 160, the mounting bars 180, the transverse barriers 136 and 164 and the body shell 101, and are longitudinally aligned. Each plenum chamber 190 is divided into plenum compartments 191 and 192, the former being bounded by the conveyors 160, the mounting bars 180, the transverse barrier angles 164 and 174 and the body shell 101, and are longitudinally aligned. Plenum compartments 192 are bounded by the conveyors 160, the mounting bars 180, the transverse barrier angles 174 and 163 and the body shell 101 and are longitudinally aligned. Superatmospheric air communication to the plenum compartments 191 and 192 is provided through inlet coupling 235 secured through the body shell 101 as by welding (see FIG. 7).

An important feature of the present invention resides in the method of fabricating the permeable conveyors 160 within the body shell 101, this process being diagrammatically illustrated in FIGS. 5 and 8 to 10 of the drawings. The body shell is first fabricated as was described hereinabove and as illustrated in FIGS. 3 and 4 and the V-shaped support 181 is mounted in place. The two permeable conveyors 160 taken together are formed in three sections, and referring to FIG. 3, the first longer section extends from the righthand end slope sheet structure 135 to the transverse support plate 179, the middle shorter section extends between the adjacent transverse support plates 179 disposed on either side of the mounting ring 125, and the second longer section is identical to the first longer section and extends from the associated transverse support plate 179 to the other end slope sheet structure 135. These three individual pieces of fabric sheet 170 have secured to the longitudinal edges thereof clamping bars 175, the clamping bars 175 on the longer end sections of the fabric sheet 170 being in several sections and each section is firmly secured to an edge of the fabric sheet 170 by a plurality of panhead or flat head rivets 178 that have been illustrated as being of the two-piece type. Each of the three sections of fabric sheet 170 with the clamping bars 175 attached can be rolled up into a compact bundle, and the two longer end sections can further be folded about transverse lines, so that the resultant folded and rolled fabric sections with attached clamping bars 175 can be readily inserted through one of the manways 110 or 115. It is noted that the central section of the fabric sheet 170 also has secured thereto the mounting ring 125 and the clamping ring 129 by means of the bolts 118, there being six of the bolts 118. After inserting the three fabric sheet sections through the manway and into the shell 101, the sections are arranged with the end sections in position as illustrated in FIG. 9 with the clamping bars 175 on the outer side of the adjacent mounting bars 180 so as to stretch the fabric 170 therebetween. In addition, the central fabric sheet section is secured in place by use of the bolts 128 inserted through alternate holes in the mounting ring 125, the bolts 128 securing the mounting ring 125 to the outlet fitting 121 (see FIG. 6). The three fabric sheet sections are now in position and ready to be secured in place by a frame 161 which will be more fully described hereinafter, and by clamping plates 172, 173 and 183.

The clamping plates 172, 173 and 183 are positioned transversely above the porous fabric 170 and their length typically corresponds to the inside width of the frame 161. The right end of longer porous fabric 170 (see FIG. 4) is clamped between the end transverse barrier angle 163 and the clamping plate 183 by means of screws. The longer porous fabric 170 is clamped between the intermediate transverse barrier angle 174 and the clamping plate 172 by means of screws 176 (see FIGS. 3 and 4). The left end of the longer porous fabric 170 and the right end of the center porous fabric 170 abut centrally about the transverse support plate 179 and are clamped thereto by means of the clamping plate 173 and screws 176. The center porous fabric 170 is clamped between the center transverse barrier angles 164 and the clamping plates 184 by means of screws 176.

The frame 161 includes a plurality of side frame members 165 and 185 and end frame members 171. Each of the side frame members 165 is formed as three sections in each of the body shell end sections 103, each of the side frame members 185 is formed as one section in the body shell central section 102, each of the side frame members having a cross section best illustrated in FIGS. 8, 9 and 10. More specifically each side frame member 165 includes a vertically oriented wall 166 provided at the upper edge thereof with an outwardly extending flange 167 disposed at an obtuse angle with respect thereto. Disposed essentially normal to the lower edge of the wall 166 is a clamping flange 168 that extends therefrom in the same general direction as the flange 167. The outer edge of the clamping flange 168 carries a downturned side flange 169. Each of the side frame members 185 has a cross section like the side frame members 165 described above. The side frame members 165 abut each other and the side frame members 185 and are joined thereto as by welding. Each end frame member 171 is formed as a single section having a cross section including a vertically oriented wall 187 provided at the upper edge thereof with an outwardly extending flange 188 disposed at an obtuse angle with respect thereto (see FIG. 4). The ends of the vertically oriented wall 166 of the side frame members 165 are interconnected normally to the ends of the vertically oriented wall 187 of the end frame member 171 as by welding, and the ends of the flanges 167 of the side frame members 165 are mitered and interconnected to the mitered ends of the flange 188 of the end frame member 171 as by welding.

Referring to FIG. 9, it will be seen that the frame 161 can be now lowered into place from the position illustrated in FIG. 9 to that illustrated in FIGS. 8 and 10, after which the side frame members 165 and 185 and the end frame members 171 are fixedly secured in position as by welding at 182. When applied and installed as described above, the surface of the fabric sheets 170 and each end of the body shell 101 slopes downwardly towards the sump 120 at an angle of about 4° with respect to the horizontal. It is pointed out that proper permeability to air under pressure is an important characteristic of the fabric sheets 170.

As was stated hereinabove, there is formed beneath the permeable conveyors 160 and between the permeable conveyors 160 and the body shell 101 the plenum chambers generally designated by the numeral 190, two of the plenum chambers 190 being provided extending from the central barrier angle 164 respectively outwardly to the outer ends of the body shell 101. Each of the plenum chambers 190 is divided into two longitudinally aligned plenum compartments 191 and 192 by the transverse barrier angles 174 (see FIG. 3) for purposes to be discussed more fully hereinafter.

There also is provided between the slope sheets 141, 145 and 150 on the one hand and the body shell 101 on the other hand and between slope sheet structures 135 and 136 and the body shell end headers 104 a slope sheet channel 195 extending along each side of the body shell 101 and around both ends thereof, thereby constituting a single volume.

Referring to FIGS. 11 and 17–19, there has been provided for the railway car 100 a pneumatic unloading apparatus carried on the body shell 101 on the lower generally central portion thereof. The pneumatic unloading apparatus includes an outlet structure 200 mounted on the body shell 101 below the sump 120 in position to receive pulverulent material falling through the openings 122 and 126. Disposed in the outlet structure 200 is a butterfly valve 201 having an actuator 202 therefor. The butterfly valve 201 is in turn connected to an outlet nozzle 205 having two headers 207 and 307 extending laterally therefrom and in a direction transverse to the longitudinal axis of the body shell 101. It will be noted that the butterfly valve 201 has the axis of rotation thereof oriented horizontally and longitudinally of the length of the railway car 100. The butterfly valve 201 serves to meter the pulverulent material-air mix discharge from the outlet structue 200 into the outlet nozzle 205 and the headers 207 and 307 thereon. Each of the headers 207 and 307 is provided with a dust cap 208 and 308, respectively, removably mounted on the ends thereof during transport of the railway car 100. During the unloading of pulverulent material from the body shell 101 using the pneumatic discharge system, the dust cap 208 or 308, as the case may be, is removed from the associated header 207 or 307 and a discharge pipe 209 or 309 is attached thereto.

Air for unloading pulverulent material using the pneumatic unloading apparatus is supplied to the railway car 100 from air supply conduits 210 or 310 which are adapted to be connected to the inlets through check valves 211 or 311 (see FIGS. 11 and 20), the inlets of the check valves being normally closed by dust caps (not shown) during the transport and storage of the railway car 100. The check valves 211 and 311 are in turn connected to pipes 212 and 312.

The other connections to the pipe 212 will now be described with special reference to FIG. 11, the other connections to the pipe 312 to be described hereinafter. The pipe 212 is oriented essentially normal to the longitudinal axis of the railway car 100 and when the conduit 210 is connected to the check valve 211, there is supplied thereto high pressure air at a superatmospheric pressure in the general range of 15 p.s.i.g. to 45 p.s.i.g. The pulverulent material within the container of the body shell 101 may be either discharged therefrom either directly by gravity, as to a pit, or by the pneumatic unloading apparatus. To that end, the outlet nozzle 205 has a bottom cover 219 which is hingedly connected to the outlet structure and is secured thereto by clamps 206 (see FIGS. 17 and 18 also). By removing the clamps 206, the outlet cover 219 can be swung out of the way, whereby the pulverulent material within the container of the body shell 101 can be discharged directly to the exterior of the railway car 100 under the influence of gravity. With the outlet cover 219 in position and the clamp 206 tightened, the parts are in condition to unload pulverulent material from the body shell 101 using the pneumatic unloading apparatus.

Figure 11:
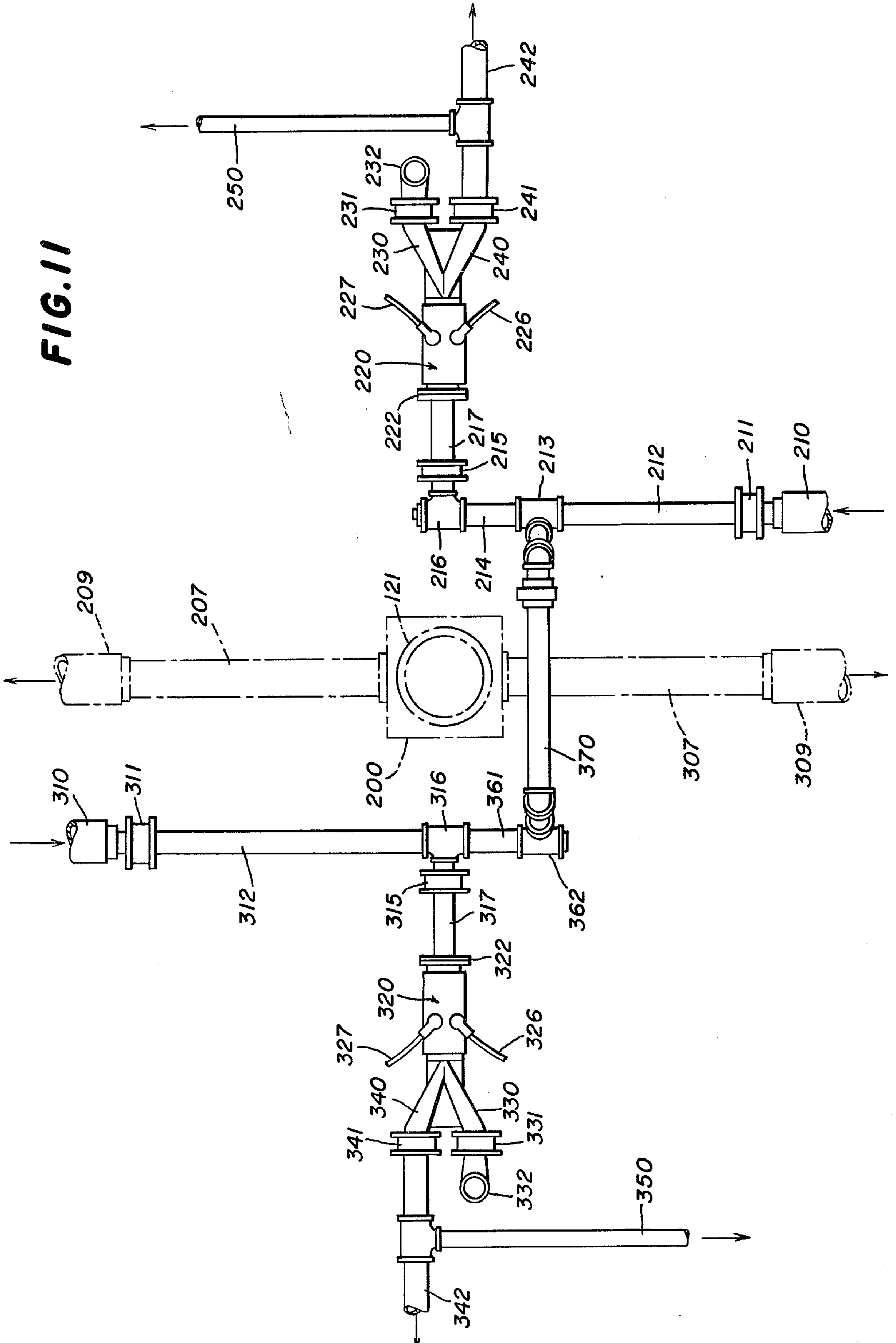
FIG. 11 is a fragmentary view of a portion of the piping system essentially as seen in the direction of the arrows along the line 11—11 in FIG. 1.
Figures 12, 13:
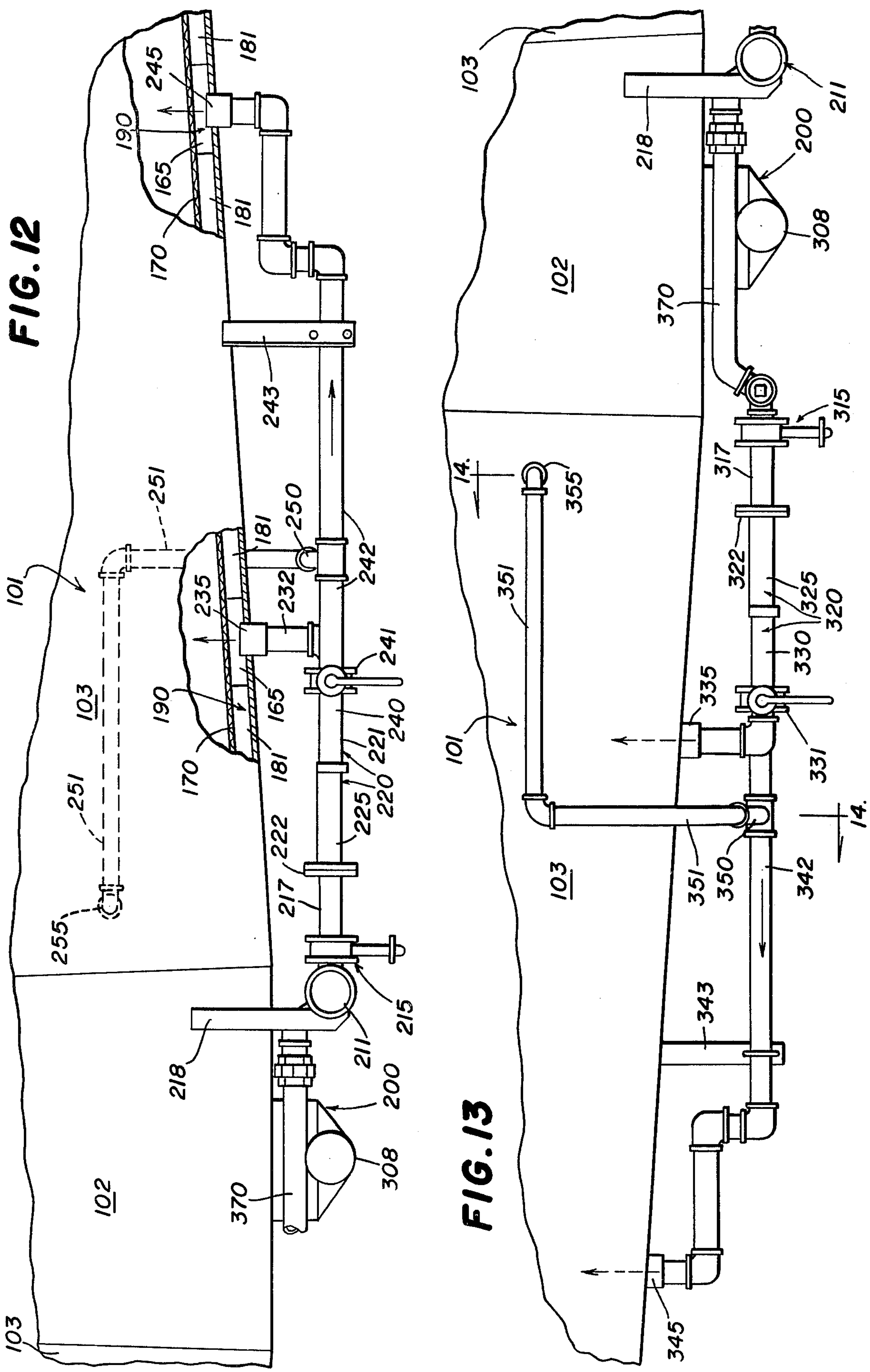
FIG. 12 is an enlarged view of the righthand end of the lower portion of the railway car of FIG. 1 with certain portions broken away and illustrating the piping system associated therewith.
FIG. 13 is a view similar to FIG. 12 and illustrating the piping associated with the lefthand end of the railway car of FIG. 1.
Figures 17, 18, 19:
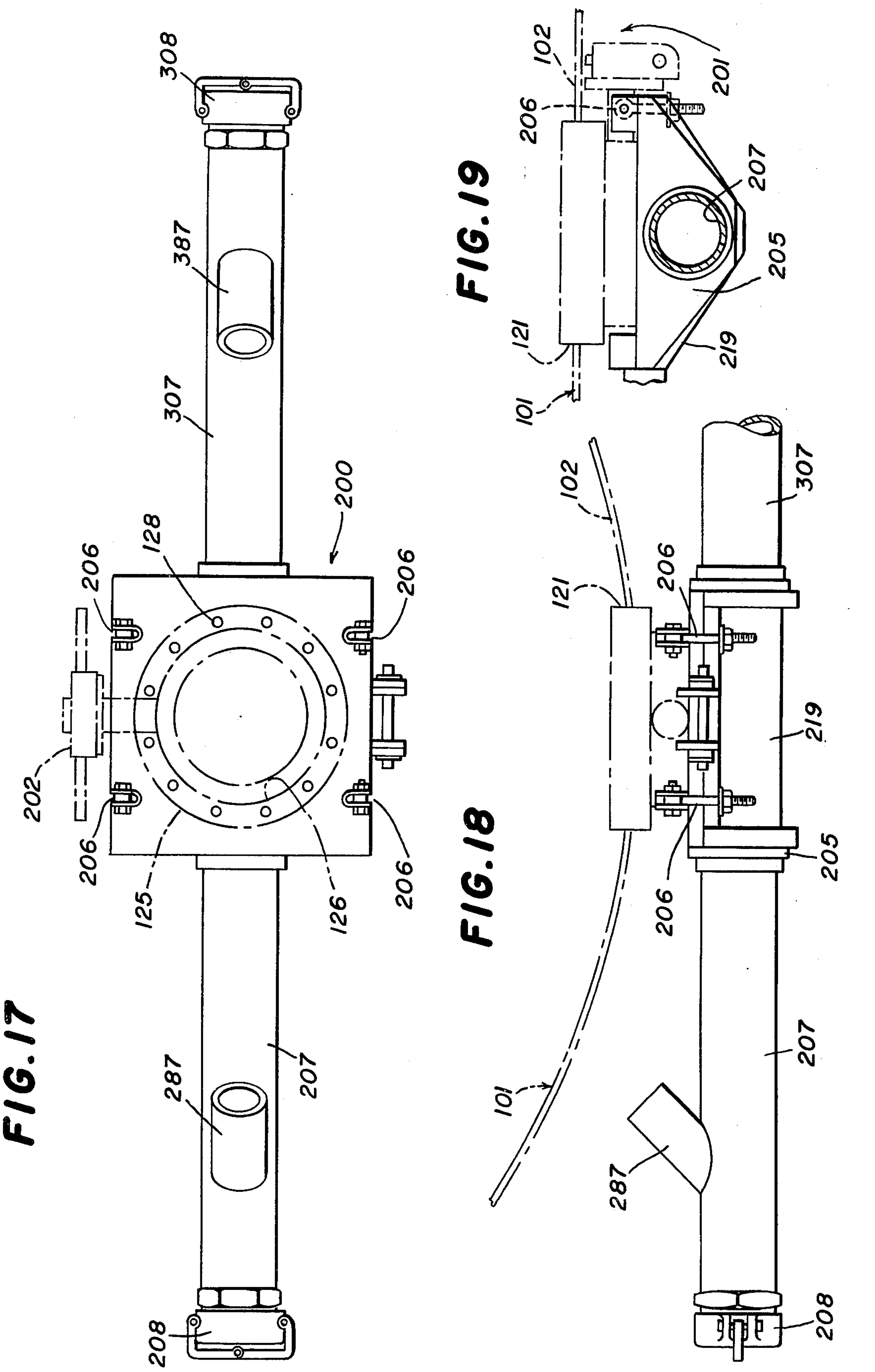
FIG. 17 is a plan view of the discharge nozzle mounted on the bottom of the railway car of FIG. 1.
FIG. 18 is a side elevational view of a discharge nozzle illustrated in FIG. 17.
FIG. 19 is a view in transverse section through the discharge nozzle of FIGS. 17 and 18.

In the pneumatic unloading apparatus, the pipe 212 is connected to a tee 213 (see particularly FIGS. 11, 12 and 13). The pipe 212 is used to convey air to the unloading apparatus for the righthand end of the railway car 100 as illustrated in FIG. 12 and to the right in FIG. 11 when discharging the fluidized stream of pulverulent material through the header 307 and the discharge pipe 309 connected thereto, at which time it will be understood that the dust cap 208 is attached to the open end of the header 207. Air for operating the pneumatic discharge apparatus for the lefthand end of the railway car 100 illustrated in FIG. 13 of the drawings and to the left in FIG. 11 is also supplied from the pipe 213 through the tee 213 and through a crossover pipe 370. The tee 213 is also connected to a pipe 214 which through a tee 216 is connected to a butterfly valve 215 which controls the flow of air to a coupling 217 which in turn through an inlet connection 222 supplies air under superatmospheric pressure to a diverting valve mechanism generally designated by the numeral 220.

An important feature of the present invention resides in the provision of the diverting valve mechanism 220 for alternately directing superatmospheric air to the two plenum compartments 191 and 192 in the associated plenum chamber 190 below the permeable conveyor 160 disposed in the righthand end of the body shell 101 as viewed in FIG. 12. Control conduits 226 and 227 are connected to the diverting valve mechanism 220 from control mechanism (not shown), the diverting mechanism 220 serving to divert the superatmospheric air stream to a first outlet 230 and then to a second outlet 240 and then back to the first outlet 230, etc. Disposed in the outlet 230 is a valve 231 that connects to a pipe 232 which extends upwardly and communicates with the plenum compartment 191 of the associated plenum chamber 190 (see FIGS. 12 and 20) through a coupling 235. The second outlet 240 has a valve 241 therein that connects through a pipe 242 supported by a bracket 243 and connected to an input coupling 245 communicating with the plenum compartment 192 of the associated plenum chamber 190 (see FIGS. 3 and 4 also). The diverting valve mechanism 220 is constructed, arranged and operates as the diverting valve mechanism 200 in U.S. Pat. No. 3,469,888, and the disclosure thereof is incorporated herein in its totality by reference. Summarizing, the operation of the diverting valve mechanism 220 continues with the resultant switching of the main air stream from the diverting valve mechanism 220 into the outlet conduits 230 and 240 alternately. Thus, the diverting valve mechanism 220 constitutes an oscillator for effecting cyclic control of the main air stream, thus to effect cyclic diverting of the main air stream between the outlets 230 and 240. Such diverting of the main air stream through the outlets 230 and 240 thus causes cyclic unloading along the permeable conveyor 160 in the righthand end of the body shell 101 as viewed in FIG. 12. Preferably, the diverting valve mechanism 220 operates alternately between its two positions, i.e., between the positions diverting the air stream to the outlets 230 and 240, respectively, at a frequency dependent upon the design of the vehicle being unloaded, the density of the lading, etc., but generally in the range from about 2 to 20 cycles per second, the preferred frequency being about 15 cycles per second. There results an even unloading of the pulverulent material from the associated permeable conveyor 160. More specifically, such action induces mechanical vibration in the conveyor 160 tending to collapse "rat holes" that may develop during the fluidization of the pulverulent material and which could cause short circuiting of the fluidizing air. This action also permits a shallower longitudinal slope of the permeable conveyor 160, i.e., a slope of about 4°, rather than the usual 8°, thus making better utilization of the cross section of the railway car 100 and increasing the capacity thereof for given dimensions thereof. Furthermore, such cyclic action in fluidization of pulverulent material along the permeable conveyor 160 will move certain commodities therealong which otherwise could not have been feasible or practicable with prior unloading systems.

The high pressure air supplied by the outlets 230 and 240 is carried through the associated couplings 235 and 245 to the plenum compartments 191 and 192 of the plenum chamber 190 associated with the portion of the permeable conveyor 160 disposed to the right as viewed in FIG. 12, which high pressure air proceeds through the fabric sheet 170 and into the trough 130 associated therewith and thus into the lading compartment 132 defined by the body shell 101 and the slope sheet structures 131, 135, 136 and 140. The passage of air through the fabric sheet 170 effects aeration or fluidization of the adjacent portion of the pulverulent material in the trough 130 and the consequent fluid flow of the pulverulent material downwardly in the trough 130 into the sump 120; and from the sump 120 the pulverulent material is conveyed to the exterior of the body shell 101 through the outlet structure 200. Since the air chamber associated with the fabric sheet 170 is in open communication along the entire length thereof and constitutes the common plenum chambers 190, there is always ample air under relatively high pressure in the common plenum chambers 190 for the purpose of fluidizing the pulverulent material contained in the adjacent end of the railway car 100. Moreover, since there is only a relatively small pressure drop or gradient between the plenum chambers 190 associated with the fabric sheet 170 and the lading compartment 132, the various parts are subject only to a small pressure differential, with the result that the relatively high pressure in the plenum chambers 190 and in the lading compartment 132 produces no substantial strain or deformation of the parts incident to the unloading of the pulverulent material from the lading compartment 132.

The diverting valve mechanism 220 not only serves to divert or switch the main air stream between the outlets 230 and 240, but this switching is effected rapidly, there being rapid operation of the diverting valve mechanism 220 under the action of the control mechanism. As a result, the supply of air under superatmospheric pressure into the plenum chambers 190 associated with the fabric sheet 170 is initiated abruptly with the result that a high velocity shock wave is produced that travels through the plenum chambers 190 with the consequent vibration of the associated section of the flexible fabric sheet 170 and the resultant shaking of the adjacent portion of the pulverulent material in the bottom of the trough 130 associated with the fabric sheet 170. This action serves to clear or unblock the fabric sheet 170 throughout the areas thereof further to break up any clumps or non-pulverulent areas in the material.

As a consequence, there is a more even and more constant feeding of the pulverulent material downwardly along the trough 130 and into the sump 120, with the subsequent more rapid and more even discharge of the pulverulent material from the railway car 100. Not only is the supply of air under superatmospheric pressure into the plenum chambers 190 abruptly initiated, but such supply of air is also abruptly arrested causing a corresponding rapid change of the pressure in the air in the plenum chambers 190 with the consequent vibration in the flexible fabric sheet 170 and the resultant shaking of the adjacent portion of the pulverulent material in the bottom of the associated trough 130. Thus the clearing and unclogging action described above is obtained twice during the supplying of air to the portion of the fabric sheet 170 disposed to the right in FIG. 12, both at the initiation of the passage therethrough and at the arresting of the passage of air therethrough.

The unloading of the lefthand end of the railway car 100 is accomplished using apparatus and methods like that described above in unloading the righthand end of the railway car 100, the apparatus being illustrated in FIG. 13 of the drawings and to the left in FIG. 11 of the drawings. More specifically, when the high pressure air is connected to the pipe 212 so as to discharge the pulverulent material through the header 307 and the discharge pipe 309, air to operate the unloading mechanism for the lefthand end of the railway car 100 is derived from the crossover pipe 370 as described above. The parts of the air discharge apparatus for the lefthand end of the railway car 100 are the same construction as those for the righthand end of the railway car 100 and have had applied thereto numerals in the 300 series that correspond to like numbered parts in the 200 series described above. The details of construction and operation of the pneumatic discharge apparatus of the 300 series will not be described in detail in the interest of brevity, but it is pointed out that these parts are constructed and arranged like those in the 200 series and operate in the same manner. Furthermore, the operation of the parts in the 200 series and the 300 series is essentially parallel and continuous.

If it is desired to unload the pulverulent material from the other side of the railway car 100, i.e., through the header 207 rather than the header 307, then an air supply conduit 310 is connected to the input to the check valve 331 and a dust cap is left on the inlet to the check valve 211. The dust cap 208 on the end of the header 207 is removed and the discharge pipe 209 connected thereto, while the dust cap 308 is retained on the outer end of the header 307. The parts then operate to unload and pulverulent material under pneumatic conditions in the same fashion as described above with unloading through the header 307, the only difference being the direction of unloading thereof, i.e., through the header 207 and upwardly as viewed in FIG. 11 and to the left as viewed in FIGS. 17 and 18.

In order to minimize the stresses applied to the slope sheets forming the troughs 130, means is provided to supply high pressure air in the slope sheet channel 195, the air essentially being derived from the pipe 242 for the righthand end of the railway car 100 as viewed in FIG. 12 and from the pipe 342 for the lefthand end of the railway car 100 as viewed in FIG. 13. Referring first to the righthand end of the railway car 100, the pipe 242 has a pipe 250 extending outwardly therefrom and connecting to an upwardly extending pipe 251 having connected to the upper end thereof a coupling 255 that passes through the body shell 101 and communicates with the interior of the slope sheet channel 195. In this way, high pressure air is provided in the slope sheet channel 195 at the righthand end of the railway car 100 during the pressurized unloading of the pulverulent material therefrom. Referring to FIGS. 11, 13 and 14, the supply of high pressure air to the slope sheet channel 195 in the lefthand end of the railway car 100 will be described. The pipe 342 has a pipe 350 extending laterally therefrom and arranged essentially horizontally (see FIG. 14) and connected at the outer end thereof with an upwardly directed pipe 351. The upper end of the pipe 351 connects with a coupling 355 that passes through the body shell 101 and communicates with the associated slope sheet channel 195. In this fashion, the slope sheet channel 195 in the lefthand end of the railway car 100 is pressurized during the pressure unloading of the pulverulent material from the railway car 100. Such pressurization of the slope sheet channel 195 reduces the stresses applied thereto, the air pressure within the slope sheet channel 195 being essentially equal to that within the body shell 101, whereby the only force applied to the slope sheets is the weight of the pulverulent material within the lading compartment 132.

An air-assist system 280 is provided so that air within the body shell 101 supplied thereto by the plenum chambers 190 and through the fabric sheet 170 can be returned to the pulverulent material discharge point, and particularly to the header 207 or 307 that is being utilized for the discharge purpose. This system is illustrated in FIGS. 1, 15 and 16 of the drawings. Referring first to FIG. 15 and the header 207, an arm 287 extends therefrom (see FIGS. 17 and 18 also) that is connected by a coupling 281 to a pipe 282. The pipe 282 connects to a check valve 284 that in turn connects to a control valve 285 having connected thereto a pipe 286. The pipe 286 is connected by a pipe 288 to a pipe 298 that in turn is coupled to a pipe 291. As can be seen in FIG. 1, the pipe 291 extends to the left therein essentially to the end of the body shell 101 and there connects with an upwardly extending pipe 292 that connects to a tee 298. The horizontal leg of the tee 298 connects to a pipe 294 having connected thereto a valve 299 communicating with the atmosphere. The upper vertical leg of the tee 298 connects to a pipe 293 that extends along the top of the body shell 101 and is connected to a coupling 295 passing through the top of the body shell 101 adjacent to one of the manways 115 and communicating with the interior of the lading compartment 132. There is also provided in the top of the body shell 101 a safety vent 297 in the form of a rupturable disc (see FIG. 20).

The outlet header 307 (see FIGS. 15 and 16) is likewise provided with an arm 387 (see FIG. 17 also) that is connected by a coupling 381 to a pipe 382 that connects to a check valve 394. The check valve 384 connects to a control valve 385 that in turn is connected by a pipe 386 to the junction of the pipes 288 and 289.

In the operation of the air-assist system 280, the coupling 295 receives air from the interior of the body shell 101 and that air is then passed along the pipe 283 and downwardly along the pipe 292 in the direction of the arrow in FIG. 16 and then into the pipes 291 and 289. Depending upon which of the headers 207 or 307 is in operation, the air either passes along the pipes 286 or 386 and through the control valves 285 or 385 and the check valves 284 or 384 and to the associated header 207 or 307. In this fashion, any excess pressure within the body shell 101 directs air outwardly therefrom and back to the operative header 207 or 307 and is therefore available to assist in conveying the pulverulent material to its destination through the associated header 207 or 307.

Figure 20:
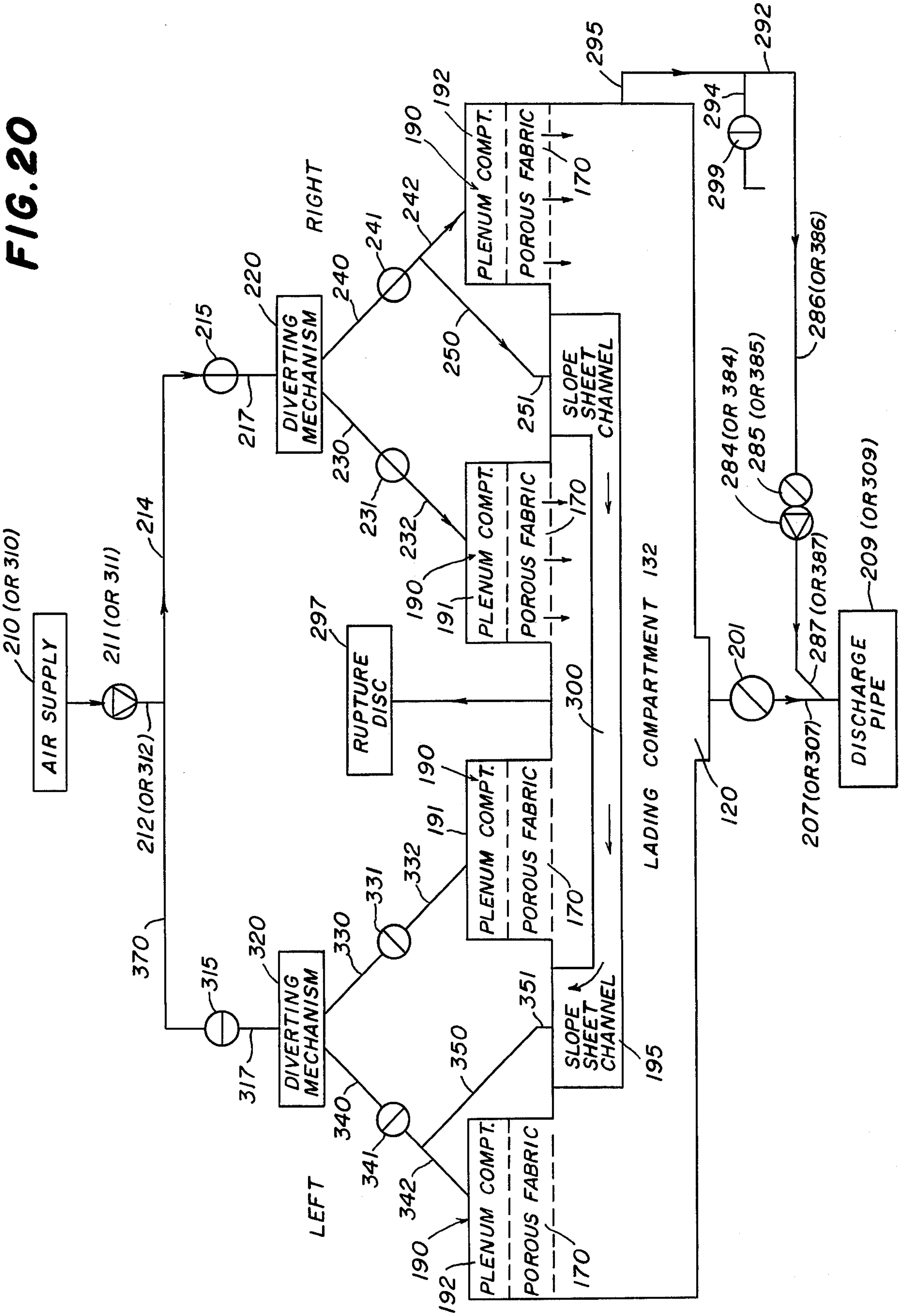
FIG. 20 is a schematic diagram of the piping system for supplying air to the railway car of the present invention during the discharge of pulverulent material therefrom.

Referring to FIG. 20 of the drawings, there is schematically illustrated an overall view of the pneumatic unloading apparatus and the associated pneumatic features of the railway car 100, the parts being shown with the air supply 210 connected to the input to the check valve 211 and with the discharge pipe 209 connected to the header 207, whereby it will be understood that dust caps are retained on the inlet to the check valve 311 and the outlet from the header 307 (see FIG. 11 also). From the check valve 211, air under superatmospheric pressure is conveyed to the two parallel unloading systems for the righthand end of the railway car 100 utilizing the parts in the 200 series and the lefthand end of the railway car 100 using the parts in the 300 series. More specifically, the air stream from the check valve 211 is split into two portions, one portion being directed to the right by the pipe 214 and the other being directed to the left through the crossover pipe 370. It will be understood that the discharge of pulverulent material from the body shell 101 through the two permeable conveyors 160 disposed respectively in the righthand and lefthand ends thereof can proceed simultaneously. For ease in description, however, the two systems will be described separately, the first system to be described being that in the righthand end of the body shell 101 connected to the pipe 214. The pipe 214 connects to the valve 215 and from there the superatmospheric pressure air passes to the coupling 217 that supplies air for the diverting valve mechanism 220. The diverting valve mechanism 220 serves alternately to direct the air stream into outlets 230 and 240 which in turn through valves 231 and 241 are connected by pipes 232 and 242, respectively, to the two plenum compartments 191 and 192 in the associated plenum chamber 190 in the righthand end of the railway car 100. The air therefore is alternately directed to the two plenum compartments 191 and 192 diagrammatically illustrated in FIG. 20. From the plenum compartments 191 and 192, the air alternately passes through the associated portions of the fabric sheet 170 to fluidize the adjacent portions of the pulverulent material and then passes into the lading compartment 132 of the body shell 101.

Simultaneously, superatmospheric air is fed by the crossover pipe 370 to the valve 315 that supplies superatmospheric air to the diverting valve mechanism 320. The diverting valve mechanism 320 alternately passes air streams of superatmospheric pressre to outlets 330 and 340 and thence through the valves 331 and 341 which in turn supply alternate pulses of superatmospheric air to the plenum compartments 191 and 192 of the associated plenum chamber 190 in the lefthand end of the railway car 100. The air flows from the plenum compartments 191 and 192 through the associated fabric sheets 170 to fluidize the adjacent portions of the pulverulent material, after which the air passes into the lading compartment 132 of the body shell 101.

The fluidized pulverulent material flows down the slope sheets and then down the permeable conveyors 160 provided by the fabric sheets 170 and then to the outlet 200 in the center of the body shell 101. The pulverulent material passes from the outlet through the butterfly valve 201 which is adjusted to provide the desired pulverulent material and air mixture flow and then into the discharge header 207 for conveying from the railway car 100.

Passage of the superatmospheric air from the plenum chambers 190 through the fabric sheet 170 into the lading compartment 132 builds up the pressure within the tank 101. Air can flow from the tank 101 through the coupling 295 and via the pipes 293 and 292 to the control valve 285 that is in series with the check valve 284 that connects to the arm 287 on the discharge header 207. In this fashion air within the body shell 101 can be returned to the discharge header 207 by adjusting valve 285, thus effectively to utilize the air provided to the system for the pulverulent material conveying purpose. The body shell 101 is provided with a rupturable disc 297 as illustrated centrally in FIG. 20 sized to protect the tank 101 from overpressurization.

Air under pressure from the pipes 242 and 342 is connected respectively by the pipes 251 and 351 to the righthand and lefthand portions of the slope sheet channel 195 which are interconnected as is diagrammatically illustrated by the connection 300.

Considering now the general mode of loading the body shell 101 with pulverulent material, it is first noted that the clamps 206 will be placed in position to assemble the outlet cover 219 in closing relationship to the outlet fitting 121 and the sump defined thereby. The butterfly valve 201 would be closd, the end caps 208 and 308 would be placed on the ends of the discharge headers 207 and 307, respectively, and the dust caps would be placed on the ends of the air inlets to the check valves 211 and 311. The covers 111 and 116 are then removed from all of the manway structures 110 and 115 and the interior of the railway car 100 is inspected to be sure that it is in suitable condition for the product to be loaded. The body shell 101 may be loaded through any one of the three manway structures 110 and 115 until the lading compartment is completely filled. Any material on the edge or rim of the manway structure is first carefully removed and thereafter the covers 111 and 116 are returned to the closed position and sealed.

When the pulverulent material is thus loaded in the body shell 101, the lading compartment is filled with the pulverulent material and the weight thereof rests fundamentally upon the slope sheet structures 131, 135, 136 and 140 and the fabric sheet 170. The weight of the pulverulent material is also carried by the butterfly valve 201. The interior of the body shell 101 is subjected to atmospheric pressure and the lading compartment 132 defined within the body shell 101 is completely closed against the admission of moisture thereinto and consequently into the pulverulent material that is contained in the lading compartment 132.

Considering now the unloading of the pulverulent material from the lading compartment 132 defined in the body shell 101, it is first noted that such unloading may take place from either side of the body shell 101, since the necessary air supply and discharge pipes can be selectively connected on either side of the railway car 100. For purposes of illustration, the unloading of the pulverulent material from the railway car 100 will be described using the air supply conduit 210 connected to the input of the check valve 211 and the discharge pipe 309 connected to the discharge header 307; it will be understood that the dust cap 208 is in position closing the discharge header 207 and the dust cap is on the entry to the check valve 311. After connection of the source of superatmospheric air to the system by means of the air supply conduit 210, the valves 215 and 315 are opened (see FIG. 20 also) as are the valves 231, 241, 331, and 341. This supplies superatmospheric pressure to the plenum chambers 190 and through the fabric sheet 170 to the interior of the body shell 101. Superatmospheric pressure is also applied through the pipes 250–251 and 350–351 to the slope sheet channel 195. The valve 285 is also adjusted so that air within the lading compartment 132 can flow through the pipes 293, 292 and to the arm 287 of the discharge header 207.

To start superatmospheric conveying of the pulverulent material from the body shell 101, the butterfly valve 201 is opened to the proper position to give the desired pulverulent material-to-air mixture in the discharge header 307. The opening of the valves 215 and 315 and the associated valves 231–241 and 331–341, respectively, supplies alternate pulses of high pressure air alternately to the plenum compartments 191 and 192 of the associated plenum chamber 190. More specifically, the diverting valve mechanism 220 supplies first to the outlet 230 a stream of high pressure air that passes through the valve 231 and the pipe 232 into the plenum compartment 191 of the righthand plenum chamber 190, the high pressure air effecting aeration or fluidization of the adjacent layers of pulverulent material in the lading compartment; whereby such adjacent layers of fluidized pulverulent material slide down the fabric sheet 170 and empty into the sump 120 disposed at the lower end thereof; whereby for a brief period the pulverulent materials are emptied into the sump 120 from the portion of the permeable conveyor 160 disposed to the right of the sump 120 and adjacent thereto, and the pulverulent materials are unloaded from the sump 120 to a receiving bin via the pneumatic unloading equipment illustrated.

After a brief period of operation through the outlet 230, depending upon the desired frequency of operation referred to hereinabove, the associated control valve operates to switch the diverting valve mechanism 220 so that the stream of high pressure air is now directed into the outlet 240 and through the valve 241 and the pipe 242 to the plenum compartment 191 of the plenum chamber 190 disposed to the right and farthest away from the sump 120. Again, the high pressure air effects aeration or fluidization of the adjacent layers of the pulverulent material in the lading compartment, whereby such adjacent layers of fluidized pulverulent material slide down the fabric sheet 170 of the permeable conveyor 160 from the righthand end of the lading compartment and onto the fabric sheet 170 of the permeable conveyor 160 immediately to the right of the sump 120 and eventually empty into the sump 120 disposed at the lower end thereof, whereby the righthand end of the lading compartment is emptied into the sump 120 and unloaded therefrom to a receiving bin via the pneumatic unloading equipment, all for a brief period. Thereafter, the control valve again switches the diverting valve mechanism 220 so as to divert the stream of high pressure air to the outlet 230 and thus through the valve 231 and the pipe 232 to the plenum compartment 191 of the plenum chamber 190 disposed to the right of the sump 120 but adjacent thereto, thereby again to continue unloading therefrom. Unloading continues for another brief interval and until the control valve switches the diverting valve mechanism 220 to cause the high pressure stream to issue through the outlet 240.

The pneumatic unloading system in the lefthand end of the railway car 100 including the diverting valve mechanism 320 having associated outlets 330 and 340 operates in the same manner so as to unload pulverulent material along the lefthand ones of the permeable conveyors 160 simultaneously with the unloading of the righthand end of the body shell 101 along the righthand ones of the permeable conveyors 160.

Not only do the diverting valve mechanisms 220 and 320 unload the railway car 100 via the associated permeable conveyors 160, but the switching effected under the control of the diverting valve mechanisms 220 and 320 is rapid both to initiate unloading abruptly and to arrest the unloading abruptly via the associated permeable conveyors 160. The abrupt initiation and the abrupt arresting of the flow of air through the fabric sheet 170 of the permeable conveyors 160 causes corresponding rapid changes of the pressure of the air in and causes the high velocity shock wave to travel through the associated plenum chamber with a consequent vibration of the associated fabric sheet 170 and the resultant shaking of the adjacent portion of the pulverulent material in the bottom of the trough associated therewith. As a result, each of the fabric sheet sections 170 is vigorously shaken approximately fifteen times every second to clean and clear the same and the pulverulent material lying thereover is also vigorously pounded to break up any undesirable formations thereof. Accordingly, the railway car 100 is rapidly and smoothly unloaded.

To stop conveying of the pulverulent material from the body shell 101 prior to the complete emptying of the body shell 101, the butterfly valve 201 is closed thereby to prevent discharge of air and fluidized pulverulent material to the discharge header 207. If it is desired thereafter to restart the conveying of the pulverulent material from the body shell 101, it is only necessary again to reopen the butterfly valve 201; whereby the remainder of the operation is the same as that described above in conjunction with the starting of the conveying of the pulverulent material from the body shell 101.

Considering now more fully the supply of air into the discharge header 207 for conveying purposes, the air within the lading compartment 132 flows through the outlet 200 and into the discharge header 207 and carries therewith the fluidized pulverulent material to convey the same to the associated storage bin. Auxiliary air can be added to assist in conveying the pulverulent material from the discharge header 207 to the storage bin. Also, it is pointed out that air from the lading compartment 132 flows through the pipes 292–293 and the control valve 285 via the arm 287 into the discharge header 207.

In order to clean the last vestiges of lading from the body shell 101, the diverting valve mechanisms 220 and 230 are operated singly by closing the appropriate valve 215 or 315. This provides an increased air velocity through the permeable conveyors 160 thus better to clean the same. A further increase of air velocity through the permeable fabric is provided by closing all but one of the valves 231, 241, 331 and 341 thus directing the entire air supply 210 through a single plenum compartment 191 or 192.

After the unloading of the pulverulent material from the body shell 101, the operator at his convenience may close the high pressure air supply and disconnect the same from the input to the check valve 211, and then replace the dust cap thereon. Subsequently, the operator opens the valve 299 venting the body shell 101 interior to atmospheric pressure, and then disconnects the pneumatic discharge pipe 309 from the discharge header 307. The various valves 201, 215 and 315 and 285 are then actuated to the closed positions thereof. Finally, the operator replaces the dust cap 308 on the end of the discharge header 307.

Assuming that the pulverulent material would be unloaded from the other side of the body shell 101 through the discharge header 207, the operation proceeds in the manner substantially identical to that described above, except that in this case the dust cap 208 on the discharge header 207 is removed and the discharge pipe 209 is connected thereto. The supply of superatmospheric air is connected to the inlet to the control valve 311. The unloading then proceeds in the same manner as that described above.

The use of the two parallel diverting valve mechanisms 220 and 320 respectively giving alternate pulses of high pressure air to spaced-apart points along the associated fabric sheet portions 170 of the permeable conveyors 160 permits a shallower longitudinal slope for the fabric sheet 170 while maintaining efficient fluidizing and conveying therealong. More specifically, the slope of the fabric sheet 170 of the permeable conveyors 160 can be reduced from the normal 8° with respect to the horizontal to 4° with respect to the horizontal and still provide perfectly satisfactory unloading of the pulverulent material along the permeable conveyors 160. The permeable conveyor 160 also is wider than the permeable conveyors provided heretofore, each section of the permeable conveyor 160 comrising a single uninterrupted expanse of porous fabric 170 having a width of about 24 inches in a typical construction, this single expanse of porous fabric 170 having at least as great a conveying surface as prior structures having a substantially narrower transverse dimension. The shallower slope of the permeable conveyors 160 and the wider transverse extents thereof while maintaining the same conveying capacity results in a more efficient use of the cross section of the railway car 100 with a corresponding greater volume of lading per foot of car length. In general, a shorter railway car 100 is generally a more economical design and provides a lighter weight car.

The use of the diverting valve mechanisms 220 and 230 provides more vibration for each of the associated sections of the permeable conveyors 160, so as to collapse rat holing that may develop during fluidization of some commodities and which can cause short circuiting of the fluidizing air. Furthermore, the compound vibration of each of the sections of porous fabric sheet 170 of the permeable conveyors 160 will move certain commodities along the sloped conveying surfaces which otherwise could not have been moved therealong at angles of slope as low as 4°.

As has been pointed out hereinabove, the permeable conveyors 160 which extend the entire length of the railway car 100 can for convenience purposes be partially sub-assembled exteriorly of the railway car 100. Because of the articulated structure of the clamping bars 175 for the permeable conveyors 160, the partially assembled permeable conveyors 160 can be folded and inserted through one of the manways 110 and 115, although the total length of the permeable conveyors 160 is several times the greatest transverse dimension of the body shell 101. The partial assembly of the porous fabric 170 and the clamping bars 175 and the mounting ring 125 outside of the railway car 100 provides substantial economies of construction, yet the permeable conveyors 160 are readily mounted within the railway car 100 upon the mounting bars 180, the supports 181, the barrier angles 163, 164 and 174 and the support plate 179 and quickly installed in assembled position by assembling clamping plates 183, 184, 172 and 173 using screws 176, the frame 161 using welds 182 and the mounting ring 125 on the outlet fitting 121 using bolts 128. The broad expanse of the porous fabric sheet 170 is readily supported by the improved attachment of the porous fabric 170 to the frame 161 using the clamping bars 175 and the rivets 178; an elastomeric caulk (not shown) being provided between the frame 161 and the fabric 170 over the mounting bars 180. Finally, the cross section of the frame 161 and all the associated parts is such that the parts are self-cleaning during the unloading of the pulverulent material from the lading compartment 132 so as to maintain the interior of the lading compartment 132 in a clean and sanitary condition, this being particularly important when conveying foods as the lading.

This provision of air pressurization in the slope sheet channel 195 permits the slope sheets to be designed for lading pressure only and thus minimizes the cost of construction and the weight of the slope sheets as finally assembled.

Another feature of the invention is the utilization of the air supplied for fluidization of the pulverulent material for external conveying. All air supplied is utilized for fluidization nd pressurization and is then diverted as required for reduction of the ratio of the pulverulent material-to-air mixture at the headers 207 or 307. This reduces the supply air requirements and corresponding air supply equipment costs. This is in contrast to the prior art practice of reducing the ratio of the pulverulent material-to-air mixture at the outlet of the vessel by introduction of air directly from the air source. It is to be understood though that additional air can be introduced at the headers 207 or 307 for conveying purposes if desired.

Finally, the outlet 200 incorporating the butterfly valve 201 is novel with the horizontal axis of rotation of the butterfly valve 201 being longitudinally oriented to the length of the car. The valve 201 meters the pulverulent material-to-air mixture discharge from the body shell 101.

It will be appreciated that in the event of gravity unloading of the railway car 100, the lading compartment 132 is maintained at atmospheric pressure by opening the manway covers 111 or 116 or the valve 299.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a container defining a fluid-tight storage chamber adapted to receive a pulverulent material, a manway in the top of said container providing access to the interior thereof of limited cross section, means accommodating the loading of the pulverulent material into said storage chamber, means defining a sump in the bottom of said container and communicating with said storage chamber, structure defining an elongated trough having an open top communicating with the bottom of said storage chamber, said trough occupying an inclined position in the bottom of said container and extending from a lower position disposed adjacent to said sump to an upper position disposed remote from said sump, the lower end of said trough communicating with said sump, mounting means connected to said container at the bottom of said trough and spaced from said trough defining structure, an elongated porous element, articulated clamping means secured only to said porous element along the longitudinal side edges thereof, said porous element and said clamping means being shaped to fit within the bottom of said trough and to pass through said manway in a folded condition and thereafter to be mounted in essentially a planar position in the bottom of said trough with said clamping means disposed freely in engagement with said mounting means to stretch said porous element thereover, and a frame secured only to said container above said trough, said frame having a first portion overlying said porous element around the perimeter thereof and cooperating with said clamping means and said mounting means securely to mount said porous element in a position enclosing the bottom of said trough and contacting the adjacent portion of the pulverulent material therein, said frame having a second portion disposed between said clamping means and said trough defining structure in engagement with both for laterally retaining said clamping means and rigidifying said first portion, said structure also defining an elongated plenum chamber disposed below said trough and communicating with said porous element, said porous element extending in an unbroken expanse across the entire width of said frame and said plenum chamber and said trough, and a source of air under superatmospheric pressure connected to said plenum chamber to supply air under superatmospheric pressure thereto to penetrate said porous element and to pass into said storage chamber and also to fluidize the adjacent portion of the pulverulent material in the bottom of said trough causing the fluidized pulverulent material to feed downwardly along said porous element into said sump.

2. The combination set forth in claim 1, and further including end barrier members and cross barrier members joining laterally opposed portions of said clamping means.

3. The combination set forth in claim 1, wherein said porous element is securely fastened to said clamping means by rivets passing therethrough.

4. The combination set forth in claim 1, wherein said frame includes sloping portions shaped and arranged to facilitate fall of pulverulent material thereacross, thus to be self-cleaning.

5. The combination set forth in claim 1, wherein said frame is welded to the walls of said trough to hold said porous element in operative position therein.

6. The combination set forth in claim 1, wherein said mounting means includes elongated mounting bars disposed below the longitudinally extending sides of said frame and supporting said porous element inwardly of said clamping bars, said mounting bars extending substantially the length of said frame.

7. The combination set forth in claim 1, wherein said porous element comprises a woven fabric structure.

8. A porous slide assembly for mounting in a trough disposed in the bottom of a storage chamber for pulverulent material with a plenum chamber beneath said porous slide assembly for receiving air to fluidize pulverulent material reposing upon said slide, said porous slide assembly comrising spaced-apart mounting bars in the bottom of said storage chamber extending longitudinally thereof, an elongated porous element having articulated clamping bars secured only thereto along the edges thereof, said clamping bars being laterally spaced apart a distance so as to lie freely on the outer sides of said mounting bars to stretch the elongated porous element between said mounting bars, and frame members overlying the edges of said elongated porous element and secured only to the walls of the associated storage chamber above the trough, each of said frame members having a first portion overlying said porous element along the perimeter thereof and cooperating with said clamping bars securely to mount said porous element in a position enclosing the bottom of the trough and contacting the adjacent portion of the pulverulent material therein, each of said frame members having a second portion disposed between said clamping bars and the walls of the associated storage chamber in engagement with both for laterally retaining said clamping bars and rigidifying said first portion, thereby to hold said clamping bars in the proper relationship with respect to said mounting bars and thus to mount said elongated porous element within the associated storage chamber.

9. The porous slide assembly set forth in claim 8, wherein said frame has sloping portions such that pulverulent material slides therefrom, whereby said frame is self-cleaning.

10. The porous slide assembly set forth in claim 8, and further comprising a plurality of rivets securing said elongated porous element and said clamping bars together.

* * * * *